(12) United States Patent
Myeong et al.

(10) Patent No.: US 9,644,474 B2
(45) Date of Patent: May 9, 2017

(54) UNDERGROUND LOCALIZATION METHOD AND SYSTEM THEREFOR

(71) Applicant: Korea Advanced Institute of Science and Technology, Daejeon (KR)

(72) Inventors: Hyeon Myeong, Daejeon (KR); Byeol Teo Park, Daejeon (KR); Taek Jun Oh, Ansan-si (KR); Su Young Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 268 days.

(21) Appl. No.: 14/680,297

(22) Filed: Apr. 7, 2015

(65) Prior Publication Data

US 2016/0145998 A1    May 26, 2016

(30) Foreign Application Priority Data

Nov. 25, 2014    (KR) ........................ 10-2014-0165664

(51) Int. Cl.
*G01C 21/12*    (2006.01)
*E21B 47/09*    (2012.01)

(52) U.S. Cl.
CPC .............. *E21B 47/09* (2013.01); *G01C 21/12* (2013.01)

(58) Field of Classification Search
CPC .... G01C 21/16; G01C 21/165; G01C 21/206; G01C 21/20; G01C 21/26; G01C 21/005
USPC ........................................................ 33/302
See application file for complete search history.

(56) References Cited

U.S. PATENT DOCUMENTS

| | | | | |
|---|---|---|---|---|
| 5,477,470 A | * | 12/1995 | Lewis .................... | G01C 17/26 33/364 |
| 2005/0022402 A1 | * | 2/2005 | Ash ........................ | G01C 21/16 33/321 |
| 2005/0126022 A1 | * | 6/2005 | Hansberry ............ | E21B 47/022 33/313 |
| 2009/0093981 A1 | * | 4/2009 | Withanawasam ...... | G01C 17/38 33/356 |
| 2016/0145998 A1 | * | 5/2016 | Myeong ................ | G01C 21/12 33/302 |
| 2016/0153767 A1 | * | 6/2016 | Ihlenfeldt .............. | G01B 5/008 33/503 |

* cited by examiner

*Primary Examiner* — Yaritza Guadalupe-McCall
(74) *Attorney, Agent, or Firm* — Seed IP Law Group LLP

(57) ABSTRACT

An underground localization method and a system therefor are provided. The underground localization method includes computing location information of a dead reckoning using a gyro sensor and a distance movement sensor of moving equipment, measuring physical information according to the computed location information of the dead reckoning and searching for the physical information which is determined as being matched with the location information of the dead reckoning, and optimizing a location by reflecting location information of the physical information which is determined as being matched with the location information of the dead reckoning.

10 Claims, 4 Drawing Sheets

F I G. 1
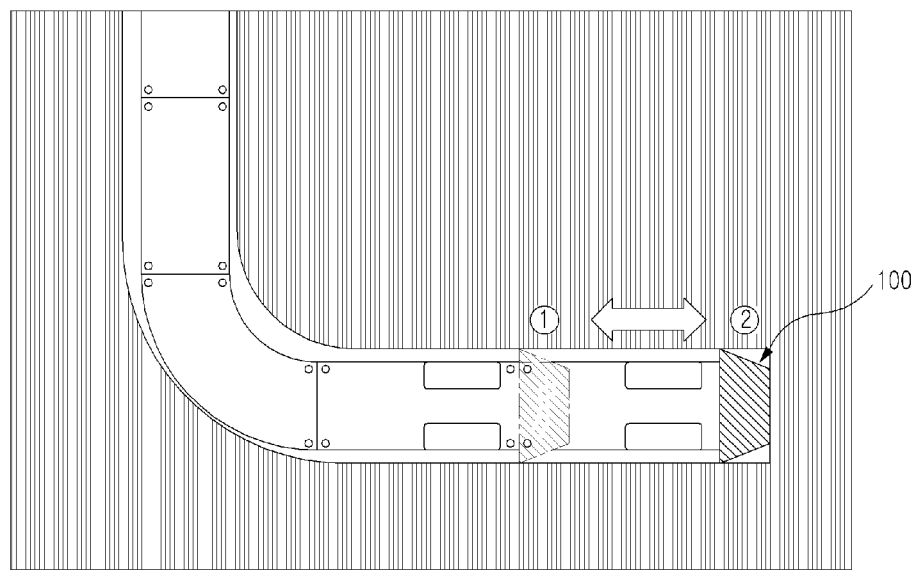

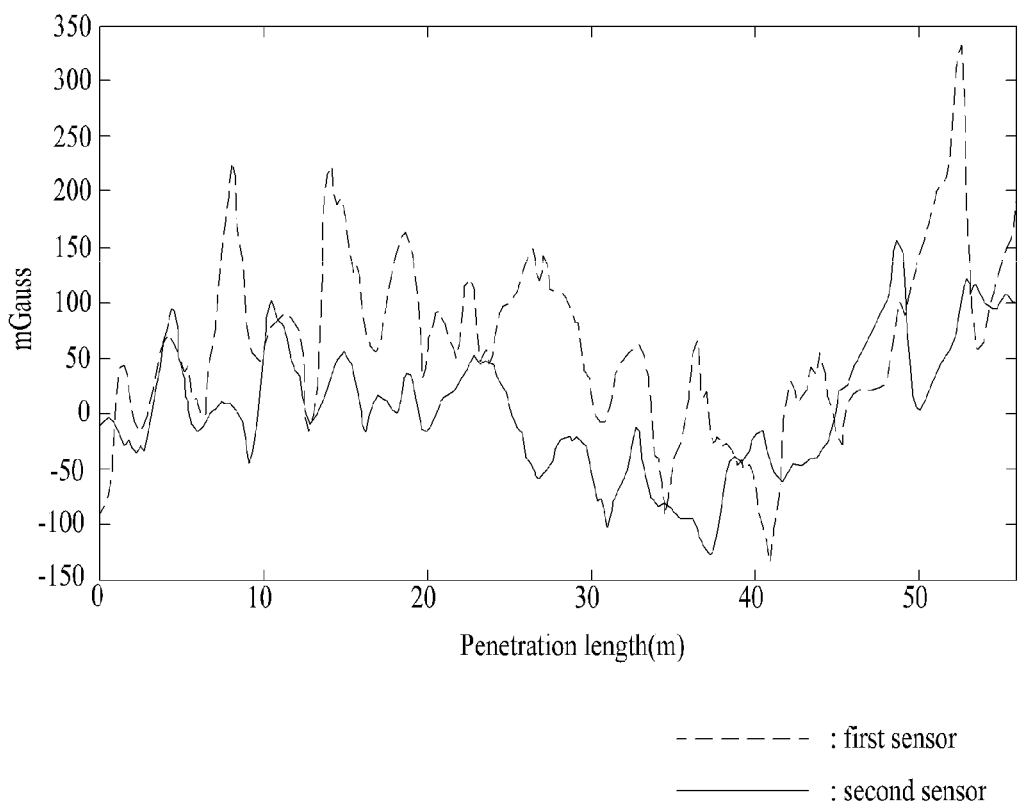
F I G . 4

UNDERGROUND LOCALIZATION METHOD AND SYSTEM THEREFOR

CROSS-REFERENCE TO RELATED APPLICATIONS

A claim for priority under 35 U.S.C. §119 is made to Korean Patent Application No. 10-2014-0165664 filed Nov. 25, 2014, in the Korean Intellectual Property Office, the entire contents of which are hereby incorporated by reference.

BACKGROUND

Embodiments of the inventive concepts described herein relate to an underground localization method and a system therefor, and more particularly, to an underground localization method of correcting a location using re-measurement of physical information and a system therefor.

Unconventional resources are collectively called "oil or natural gas resources" in which it is impossible to be developed and produced using conventional technology because they have unique geological structures and unique lying shapes. Because the unconventional resources are distributed as a continuous form throughout wide areas, they need advanced development technology. The unconventional resources are classified into unconventional oil resources and unconventional natural gas resources according to their properties. The unconventional oil resources are classified into oil sand, extra heavy oil, oil shale, shale oil and the like according to lying shapes. The unconventional natural gas resources are classified into shale gas, tight gas, coal bed methane gas, gas hydrate and the like according to lying shapes.

These unconventional resources need specialized technology suitable for characteristics according to respective resources. The reason why the unconventional resources are recently highlighted is that a variety of technologies, which may be approached to unique geological structures of the unconventional resources and may mine and collect big oil and natural gas therefrom, may be developed and applied in their production process.

Directional drilling technology is highlighted to mine the unconventional resources among the variety of technologies. The directional drilling technology is drilling technology for changing an excavation direction and performing excavation to a target point when drilling a reservoir which exists in a lower portion of each of areas, such as a mountainous area or a lower area of a lake where it is difficult to work by vertical drilling and a densely populated area and a water conservation zone where it is legally impossible to drill.

To perform this drilling work, a drilling base is made by drilling a shallow hole in the ocean floor, inserting a casing into the hole, and hardening the casing with cement. Thereafter, a blow out preventer (BOP) is connected to a riser and the BOP is lowered through a moonpool molded in the center of a drill ship. After the drilling base, the BOP, and the riser are combined with one another, a drill pipe is inserted into an empty space in the riser to perform a real drilling work. As drill bits are on the end of the drill pipe, they may efficiently destroy rocks using a torque of a top drive.

Korean Patent No. 10-0409048 relates to a drilling apparatus for discontinuity orientation measurements and describes technology about a drilling apparatus which may rotate an outer pipe of the drilling apparatus of a double pipe type which is divided into an inner pipe and the outer pipe and may perform excavation in a direct direction.

As such, the directional drilling apparatus is an apparatus which may perform excavation in a desired direction, and must ascertain its current position in an underground space and may determine whether the desired direction is any direction. Therefore, the directional drilling apparatus must be accompanied by the development of an underground localization technology.

However, because the underground environment is blocked in all directions by soil, it is impossible to perform wireless communication of a global positioning system (GPS) and the like. Sensors, such as a vision sensor (e.g., a camera, etc.) or laser distance measurement sensor, which are used in localization in a general robot field, may not used under the underground environment.

For this reason, conventional underground localization technologies may use angular velocities or accelerations which may be measured for itself using an inertial measurement unit (IMU). However, because there is no method of compensating error accumulation of sensors in a drill environment with strong vibration, it is difficult to accurately perform underground localization.

SUMMARY

Embodiments of the inventive concepts provide an underground localization method of performing re-measurement using a physical information measurement sensor when moving equipment passes a passed path again and correcting a result of a dead reckoning including errors of sensors and a system therefor.

Embodiments of the inventive concepts provide an underground localization method of mapping physical information when moving equipment first passes a position, comparing current physical information with the mapped physical information when it passes the passed position again based on a template matching method, and ascertaining localization according to similarity therebetween and a system therefor.

One aspect of embodiments of the inventive concept is directed to provide an underground localization method. The underground localization method may include computing location information of a dead reckoning using a gyro sensor and a distance movement sensor of moving equipment, measuring physical information according to the computed location information of the dead reckoning and searching for the physical information which is determined as being matched with the location information of the dead reckoning, and optimizing a location by reflecting location information of the physical information which is determined as being matched with the location information of the dead reckoning.

The measurement of the physical information and the searching for of the physical information which is determined as being matched with the location information of the dead reckoning may include measuring and mapping the physical information using a sensor according to the computed location information of the dead reckoning, comparing and analyzing the physical information and the location information of the dead reckoning and searching for the physical information which is determined as being matched with the location information of the dead reckoning, and storing location information of the found physical information which is determined as being matched with the location information of the dead reckoning.

The computing of the location information of the dead reckoning may include measuring a movement length of drill equipment using the distance movement sensor, measuring 3-axis angular velocity values using the gyro sensor, and computing the location information of the dead reckoning.

The physical information may be measurement values in which magnetic fields, gamma rays, and resistivity measurement are measured by at least one or more methods.

The searching for of the physical information which is determined as being matched with the location information of the dead reckoning may include measuring the physical information according to location information of the dead reckoning at a first sensor, which is installed in a front portion of the moving equipment, when the moving equipment moves forward, measuring the physical information according to location information at a second sensor which is installed in a rear portion of the moving equipment, comparing the results measured by the first and second sensors, and searching for the physical information which is determined as being matched with the location information of the dead reckoning.

The searching for of the physical information which is determined as being matched with the location information of the dead reckoning may include measuring the physical information according to location information of the dead reckoning at a first sensor when the moving equipment moves forward, measuring the physical information according to location information of the dead reckoning at a second sensor when the moving equipment moves backward, comparing the results measured by the first and second sensors, and searching for the physical information which is determined as being matched with the location information of the dead reckoning.

Another aspect of embodiments of the inventive concept is directed to provide an underground localization system. The underground localization system may include a location computing unit configured to compute location information of a dead reckoning using a gyro sensor and a distance movement sensor of moving equipment, a location re-measurement unit configured to measure physical information according to the location information of the dead reckoning, which is computed by the location computing unit, and to search for the physical information which is determined as being matched with the location information of the dead reckoning, and a location optimizing unit configured to optimize a location by reflecting location information of the physical information which is determined as being matched with the location information of the dead reckoning.

The location re-measurement unit may include a physical information mapping unit configured to measure and map the physical information using a sensor according to the location information of the dead reckoning, which is computed by the location computing unit, a physical information search unit configured to compare and analyze the physical information and the location information of the dead reckoning and to search for the physical information which is determined as being matched with the location information of the dead reckoning, and a search result storing unit configured to store location information of the found physical information which is determined as being matched with the location information of the dead reckoning.

The location re-measurement unit may include a first sensor which is installed in a front portion of the moving equipment and a second sensor which is installed in a rear portion of the moving equipment, wherein the first sensor measures the physical information according to location information of the dead reckoning when the moving equipment moves forward, wherein the second sensor measures the physical information according to location information of the dead reckoning, and wherein the location re-measurement unit compares the results measured by the first and second sensors and searches for the physical information which is determined as being matched with the location information of the dead reckoning.

The location re-measurement unit may include first and second sensors configured to measure the physical information, wherein the first sensor measures the physical information according to location information of the dead reckoning when the moving equipment moves forward, wherein the second sensor measures the physical information according to location information of the dead reckoning when the moving equipment moves backward, and wherein the location re-measurement unit compares the results measured by the first and second sensors and searches for the physical information which is determined as being matched with the location information of the dead reckoning.

BRIEF DESCRIPTION OF THE FIGURES

The above and other objects and features will become apparent from the following description with reference to the following figures, wherein like reference numerals refer to like parts throughout the various figures unless otherwise specified, and wherein FIG. 1 is an apparatus illustrating an underground localization method and a system therefor according to an exemplary embodiment of the inventive concept;

FIG. 4 is a waveform chart illustrating a result of performing a similar test with an underground localization system according to an exemplary embodiment of the inventive concept.

DETAILED DESCRIPTION

Figure 2:
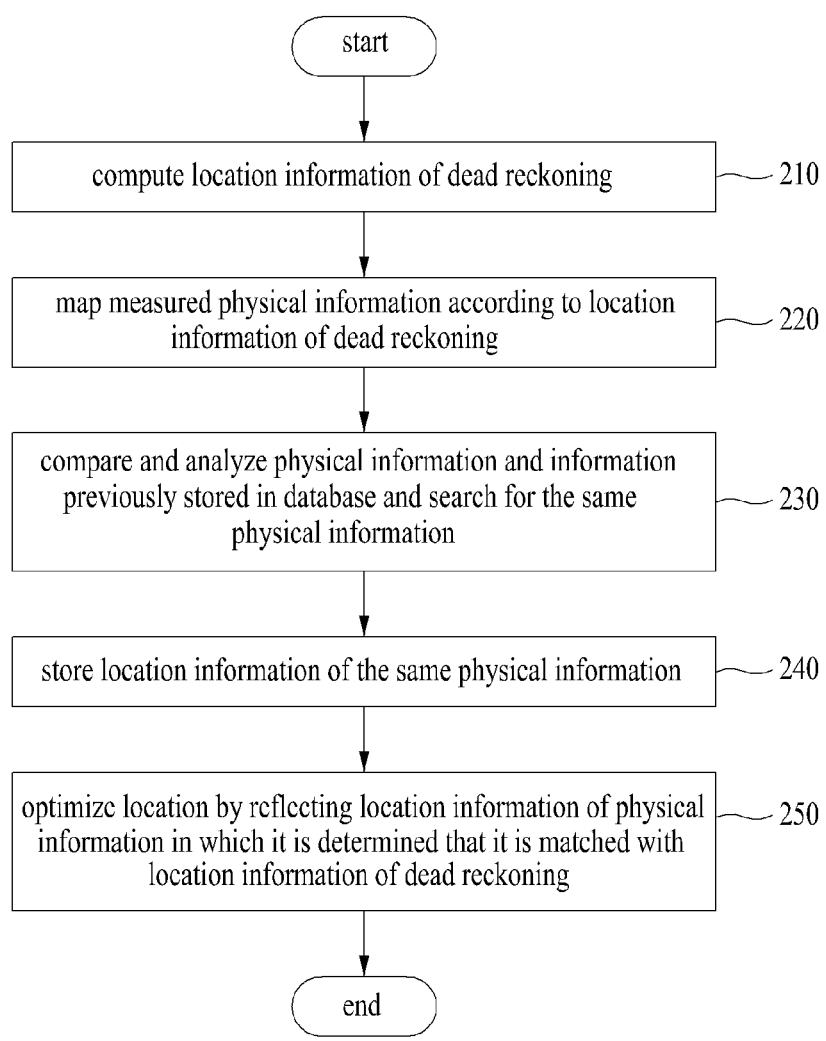
FIG. 2 is a flowchart illustrating an underground localization method according to an exemplary embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for exemplary embodiments of the inventive concept with reference to the accompanying drawings.

FIG. 1 is an apparatus illustrating an underground localization method and a system therefor according to an exemplary embodiment of the inventive concept.

Referring to FIG. 1, the underground localization system may perform a location correction method using re-measurement of physical information (magnetic fields or gamma rays, etc.) when moving equipment passes a previously passed path again.

Due to characteristics of the system, the moving equipment may moves through a hole excavated by drill bits. In other words, a rear end of the moving equipment passes along a place where a front end of the moving equipment is passed, and the moving equipment passes a path, which is passed when moving forward, when moving backward. In accordance with this characteristics, the underground localization system may map physical information when the moving equipment first passes a place, may compare current physical information with the mapped physical information when it passes the passed path again based on a template matching method, and may ascertain localization according to similarity therebetween.

Accordingly, the underground localization system may perform re-measurement using two or more physical information measurement sensors when the moving equipment passes a passed path again and may use the re-measured information in location correction. The underground localization system may estimate a location of the moving equipment based on an inertial measurement unit (IMU) and may statistically correct errors of sensors through the re-measured physical information. Although physical information or sensor data are distorted by vibration or geological states, because the underground localization system predicts the location through comparison using re-measurement, it has characteristics which are strong to the distortion.

The system must know a current location of drill equipment in an underground space and may control the drill equipment in a direction where there are oil resources. The system may perform a path planning of the drill equipment in a direction where the drill equipment does not meet another hole which is previously punched.

However, because characteristic radio waves (associated with localization) do not easily pass under underground and drill environments, it is difficult to perform localization using a GPS and a wireless sensor. Also, it is difficult to use vision sensors (e.g., a camera, etc.) and laser distance measurement sensors, which are used in indoor localization in a conventional robot field, under the underground and drill environments. Accordingly, sensors, which may be used in localization, may be limited.

Herein, the current most used sensors may be a magnetic field sensor, a gyro sensor, an accelerator sensor, and a distance movement sensor (insertion length measurement sensor) and the like.

However, in case of measuring an azimuth using the magnetic field sensor, because the ground itself or a drill machine itself interferes in an earth's magnetic field, it is difficult to measure an accurate north direction. In case of measuring the direction of gravity using the acceleration sensor, it is difficult to measure the direction of net gravity due to vibration by excavation of drill bits. Also, the gyro sensor obtains an azimuth by accumulating sensor values together with the start of drill bits. At this time, because errors are accumulated together, if a drilling work is performed during a long time, errors may be also increased.

Therefore, the underground localization system may optimize underground localization information using a location correction algorithm using re-measurement of physical information (magnetic fields or gamma rays, etc.).

First of all, a basic dead reckoning may be calculated using a distance movement sensor and a gyro sensor. However, this location recognition value by the dead reckoning has an error by noises of sensors. Thereafter, the underground localization system may reduce the error through correction and may acquire optimized location information.

Because drill equipment drills a hole and moves forward, it may have characteristics where it moves continuously along the drilled hole without moving to another place. In other words, the drill equipment may pass a position again, which is passed when it moves forward. A rear end of the drill equipment may pass a path again, where a front end of the drill equipment is passed when it moves forward. The proposed underground localization system may continuously measure physical information of sides and may compare the measured information with previously mapped information in real time.

When the drill equipment passes a passed path again, the underground localization system may measure a similar physical value. The underground localization system may sense the measured physical value, may detect a current location as a similar position, and may correct a result value of basic location recognition.

For one example, when a drill system 100 of drilling equipment moves forward, the underground localization system may perform re-measurement using sensors which are installed in front and rear ends of the drilling equipment. As shown in FIG. 1, performing excavation, the drill system 100 may move from a location ① to a location ②. If a drill bit is on the location ②, the rear end of the drilling equipment may pass the location ①. In other words, if one physical information measurement sensor is installed around the drill bit and one sensor is installed in the rear end of the drilling equipment, the sensor, which currently passes the location ①, may measure a value which is similar to physical information which is measured when the drill bit passes the location ①.

For another example, when the drill system 100 moves forward and backward, at least one or more sensors may perform re-measurement. The drill system 100 may be taken out again because of replacement of a drill bit or a hole casing. After the drill system 100 moves forward to the location ② and then moves backward, when it is taken out, the drill bit may pass the location ① again. In other words, the drill system 100 may re-measure physical information, which is measured in the location ① when it moves forward, while passing the location ① again.

In addition, for another example, when the drill system 100 moves forward and backward, sensors installed in front and rear ends of the drilling equipment may perform re-measurement. This may be applied to the same principle as the above-described re-measurement by the sensors which are installed in the front and rear ends of the drilling equipment when the drill system 100 moves forward.

FIG. 2 is a flowchart illustrating an underground localization method according to an exemplary embodiment of the inventive concept.

Referring to FIG. 2, the underground localization method will be described using an underground localization system. A description will be given in detail for the underground localization system. Herein, the underground localization system may include a location computing unit, a physical information mapping unit, a physical information search unit, a search result storing unit, and a location optimizing unit.

In step 210, the location computing unit may compute location information of a dead reckoning using sensors of moving equipment.

Herein, the moving equipment may be drilling equipment used in a drilling work. The sensors are not limited to their locations. However, at least one or more sensors may be installed around a drill bit of a drill system in the drilling equipment or in a bottom hole assembly (BHA) portion at a lower side of a drill string. Also, at least two or more sensors are preferably installed. One or more sensors may be installed in front and rear portions of the drilling equipment, respectively, or may be installed in the same locations (similar locations).

A method of computing location information of a dead reckoning may include measuring a movement length of drill equipment using a distance movement sensor (insertion length measurement sensor), measuring 3-axis angular velocity values using a gyro sensor, and computing the location information of the dead reckoning. Herein, a variety of sensors may be used if necessary to compute initial location information of the dead reckoning.

Thereafter, the underground localization system may measure physical information according to the computed location information of the dead reckoning and may search for the physical information which is determined as being the same as (being matched with) the location information of the dead reckoning. In other words, the underground localization system may correct a location of the dead reckoning by re-measuring physical information. The physical information, which is determined as being matched with the location information, may be the same or similar physical information according to a predetermined standard.

To search for the physical information which is determined as being matched with the location information of the dead reckoning, a first sensor may be installed in a front portion of the moving equipment and a second sensor may be installed in a rear portion of the moving equipment. When the moving equipment moves forward, the first sensor may measure physical information according to location information of the dead reckoning and the second sensor may then measure physical information according to location information of the dead reckoning. Thereafter, the underground localization system may compare the results measured by the first and second sensors and may search for the physical information which is determined as being matched with the location information of the dead reckoning.

Similarly, to search the physical information which is determined as being matched with the location information of the dead reckoning, when the moving equipment moves forward, a first sensor may measure physical information according to location information of the dead reckoning. When the moving equipment moves backward, a second sensor may measure physical information according to location information of the dead reckoning. Thereafter, the underground localization system may compare the results measured by the first and second sensors and may search for the physical information which is determined as being matched with the location information of the dead reckoning.

A description will be given for a method of searching for the physical information which is determined as being matched with the location information of the dead reckoning through steps 220, 230, and 240.

In step 220, the physical information mapping unit may measure and map physical information using a physical information measurement sensor according to the computed location information of the dead reckoning. In other words, the physical information mapping unit may map the physical information according to the location information which is the result value of the location computing unit.

The physical information may be measurement values in which natural physical values, such as magnetic fields, gamma rays, and resistivity measurement, are measured by at least one or more methods. Herein, the measurement values may be set to be measurement values by a gyro sensor, an acceleration sensor, a distance movement sensor and the like as well as the first and second sensors.

As described above, the first sensor, which measures the physical information, may be installed in a front portion of the moving equipment and the second sensor may be installed in a rear portion of the moving equipment. When the moving equipment moves forward, the first and second sensors, which are installed in the front and rear portions, may acquire location information by measurement and re-measurement in the same positions.

Also, when the moving equipment moves forward, a sensor (e.g., the first sensor) may measure physical information of a location according to the location information of the dead reckoning. When the moving equipment moves backward, a sensor (e.g., the second sensor) may measure physical information of a location according to the location information of the dead reckoning.

In step 230, the physical information search unit may compare and analyze the physical information and the location information of the dead reckoning and may search for physical information which is determined as being matched with the location information of the dead reckoning. In other words, the physical information search unit may search the physical information which is determined as being matched with the location information of the dead reckoning among the results of the physical information measured through the sensors (e.g., the first and second sensors).

In step 240, the search result storing unit may store location information of the found physical information which is determined as being matched with the location information of the dead reckoning.

Thereafter, in step 250, the location optimizing unit may optimize a location by reflecting the location information of the physical information which is determined as being matched with the location information of the dead reckoning.

Herein, the location optimizing unit may optimize all locations using a statistical probability distribution on sensor errors and a statistical probability distribution on errors of comparison and analysis. Herein, the location optimizing unit may acquire a number pair of similar locations (or the same locations) and may optimize a location using a computed result of the dead reckoning on the number pair of locations which are determined as the similar locations (or the same locations), a statistical probability distribution on sensor errors, and a statistical probability distribution on error of comparison and analysis.

Figure 3:
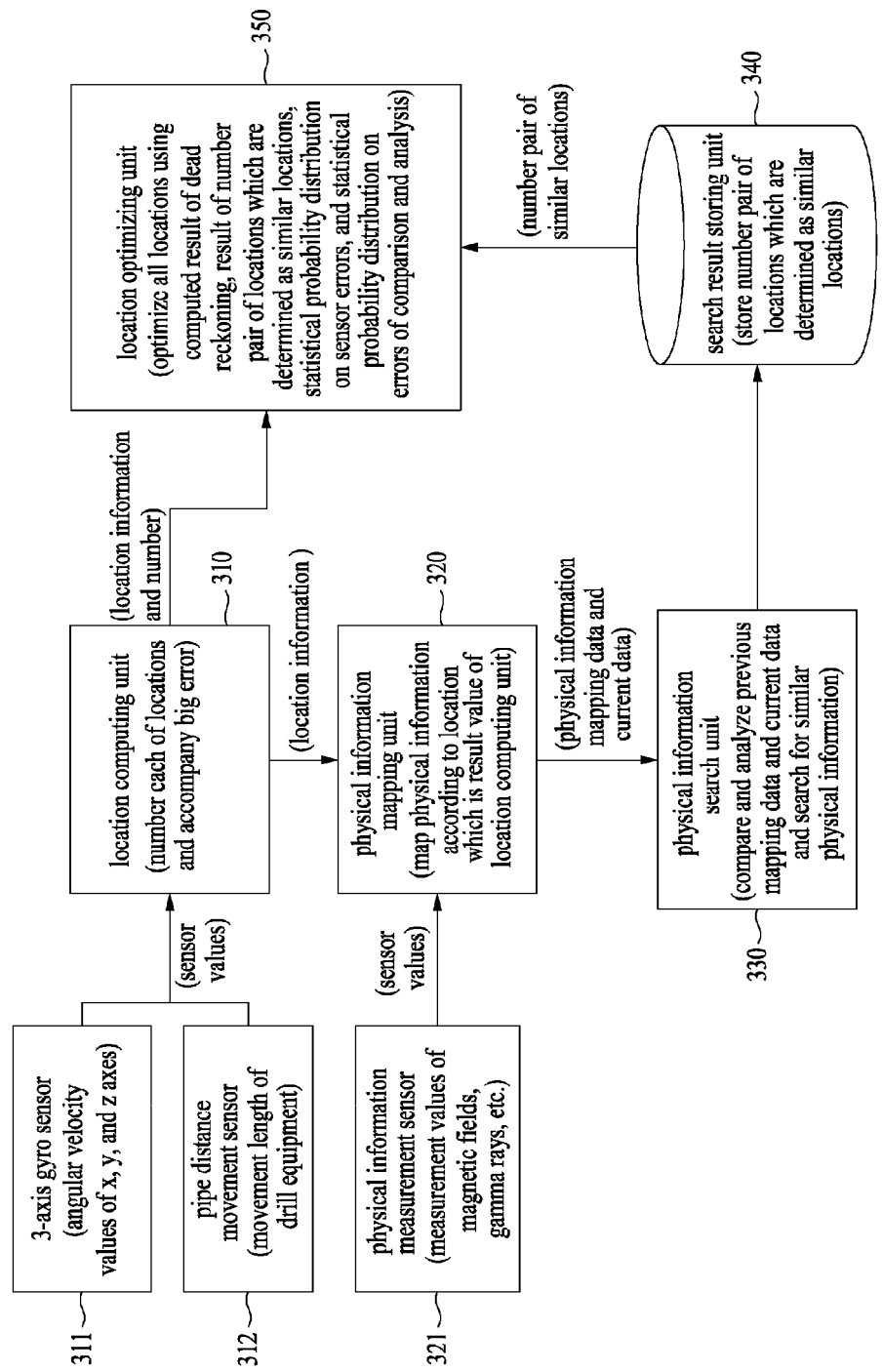
FIG. 3 is a block diagram illustrating a configuration of an underground localization system according to an exemplary embodiment of the inventive concept.

FIG. 3 is a block diagram illustrating a configuration of an underground localization system according to an exemplary embodiment of the inventive concept.

Referring to FIG. 3, the underground localization system may include a location computing unit 310, a physical information mapping unit 320, a physical information search unit 330, a search result storing unit 340, and a location optimizing unit 350. Herein, the physical information mapping unit 320, the physical information search unit 330, and the search result storing unit 340 may be included in a location re-measurement unit (not shown).

The location computing unit 310 may compute location information of a dead reckoning using sensors of moving equipment.

Herein, the moving equipment may be drilling equipment used in a drilling work.

To compute the location of the dead reckoning, the location computing unit 310 may use at least one or more of a pipe distance movement sensor 311 and a 3-axis gyro sensor 312.

In other words, the pipe distance movement sensor 312 may measure a movement length of drill equipment to measure an insertion length of a pipe. The 3-axis gyro sensor 311 may measure 3-axis angular velocity values of x, y, and z axes. The location computing unit 310 may compute the location information of the dead reckoning using these sensor values.

For example, the location computing unit 310 may number each of locations. The location at this time may accompany a big error.

The location re-measurement unit may measure physical information according to the location information of the dead reckoning, which is computed by the location computing unit 310, and may search for physical information which is determined as being matched with the location information of the dead reckoning. Herein, although it is not shown in FIG. 3, the location re-measurement unit may include the physical information mapping unit 320, the physical information search unit 330, and the search result storing unit 340. Also, the physical information, which is determined as being matched with the location information of the dead reckoning, may be the same or similar physical information according to a predetermined standard.

A sensor for measuring physical information may be configured as the same one sensor or may include at least two or more sensors, and may correct a location by the dead reckoning. Preferably, the sensor may include at least two or more sensors. When the moving equipment moves forward, the location computing unit 310 may compute location information of a dead reckoning according to a sensor value sensed by the sensor. When the moving equipment moves backward, the location re-measurement unit may measure physical information, which is determined as being matched with the location information of the dead reckoning, according to a sensor value sensed by the sensor (e.g., a physical information measurement sensor 321).

Herein, the location re-measurement unit may further include a first sensor which is installed in a front portion of the moving equipment and a second sensor which is installed in a rear portion of the moving equipment. When the moving equipment moves forward, the first sensor may measure physical information according to location information of the dead reckoning. Thereafter, the second sensor may measure physical information according to location information of the dead reckoning. Thereafter, the location re-measurement unit may compare the results measured by the first and second sensors and may search for physical information which is determined as being matched with the location information of the dead reckoning.

Similarly, the location re-measurement unit may further include a first sensor and a second sensor, which measure physical information. When the moving equipment moves forward, the first sensor may measure physical information according to location information of the dead reckoning. When the moving equipment moves backward, the second sensor may measure physical information according to location information of the dead reckoning. Thereafter, the location re-measurement unit may compare the results measured by the first and second sensors and may search for physical information which is determined as being matched with the location information of the dead reckoning.

In more detail, the physical information mapping unit 320 may measure and map physical information using the physical information measurement sensor 321 according to the location information of the dead reckoning, which is computed by the location computing unit 310.

Herein, the physical information may be measurement values in which natural physical values, such as magnetic fields, gamma rays, and resistivity measurement, are measured by at least one or more methods. The measurement values may be set to be measurement values by a gyro sensor, an acceleration sensor, a distance movement sensor and the like as well as the first and second sensors.

In other words, the physical information mapping unit 320 may measure physical information using the physical information measurement sensor 321 according to the computed location information of the dead reckoning, which is the result value of the location computing unit 310, and may map the physical information using the measured sensor value (measurement value).

The physical information search unit 330 may compare and analyze the physical information and the location information of the dead reckoning and may search for the physical information which is determined as being matched with the location information of the dead reckoning.

For example, the physical information search unit 330 may receive physical information mapping data and current data from the physical information mapping unit 320, may compare and analyze previous physical information mapping data and current physical information data, and may search for physical information which is determined as being matched with previous physical information. In other words, the physical information search unit 330 may compare and analyze values measured by the first and second sensors which are installed in the front and rear portions of the moving equipment and may search for physical information which is determined as being matched therewith. Also, the physical information search unit 330 may compare and analyze values measured by the first and second sensors which are installed in the same locations (or similar locations) of the moving equipment when the moving equipment moves forward and backward, and may search for physical information which is determined as being matched therewith.

The search result storing unit 340 may store location information of the physical information, which is determined as being matched therewith, among the found physical information. Herein, a database may be used to store the location information of the physical information.

For example, the search result storing unit 340 may store a number pair of locations which are determined as the similar locations (or the same locations).

The location optimizing unit 350 may optimize a location by reflecting the location information of the physical information which is determined as being matched with the location information of the dead reckoning.

Herein, the location optimizing unit 350 may optimize all locations using a statistical probability distribution on sensor errors and a statistical probability distribution on errors of comparison and analysis.

For example, location optimizing unit 350 may receive the number pair of the similar locations (or the same locations) from the search result storing unit 340, and may optimize a location using the computed result of the dead reckoning, a result of the number pair of locations which are determined as the similar locations (or the same locations), a statistical probability distribution on sensor errors, and a statistical probability distribution on errors of comparison and analysis.

FIG. 4 is a waveform chart illustrating a result of performing a similar test with an underground localization system according to an exemplary embodiment of the inventive concept.

FIG. 4 shows a result through the similar test with the underground localization system to certify an underground localization method. In FIG. 4, a dotted line graph may represent a test result of a first sensor and a solid line graph may represent a test result of a second sensor.

In other words, the dotted line graph may represent values of a sensor which is installed in a front portion of moving equipment and the solid line graph may represent values of a sensor which is installed in a rear portion of the moving equipment. Or, the dotted line graph may represent sensor values by dead reckoning information and the solid line graph may represent sensor values by re-measurement.

As shown in FIG. 4, it may be confirmed that a curved shape of the solid line graph similarly follows a curved shape of the dotted line graph.

Comparing the two graphs (using a normalized cross correlation method, etc.), points measured in the same locations may be ascertained.

As such, in recently collecting oil and gas resources, when the resources are distributed throughout wide areas, a directional drill work may be performed to collect resources of various directions by one punching on the ground.

In accordance with exemplary embodiments of the inventive concept, the underground localization system may reduce errors of sensors by performing re-measurement using the physical information measurement sensor when the moving equipment passes the passed path again and correcting the dead reckoning.

Also, the underground localization system is strong to errors by vibration or distortion in comparison with conventional technologies. Because of characteristics of a resource development field business which sets equipment rental and service fees according to a work time, if time is delayed due to errors, more costs must be paid. Therefore, in accordance with exemplary embodiments of the inventive concept, the underground localization system may effectively perform resource development at low cost at a quicker time. In addition, a localization apparatus may be efficiently be used by adding the directional drilling technology to the advanced robot technology.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:
1. An underground localization method comprising:
   computing location information of a dead reckoning using a gyro sensor and a distance movement sensor of moving equipment;
   measuring physical information according to the computed location information of the dead reckoning and searching for the physical information which is deter- mined as being matched with the location information of the dead reckoning; and optimizing a location by reflecting location information of the physical information which is determined as being matched with the location information of the dead reckoning.

2. The underground localization method of claim 1, wherein the measurement of the physical information and the searching for of the physical information which is determined as being matched with the location information of the dead reckoning comprises:

measuring and mapping the physical information using a sensor according to the computed location information of the dead reckoning;

comparing and analyzing the physical information and the location information of the dead reckoning and searching for the physical information which is determined as being matched with the location information of the dead reckoning; and storing location information of the found physical information which is determined as being matched with the location information of the dead reckoning.

3. The underground localization method of claim 2, wherein the physical information is measurement values in which magnetic fields, gamma rays, and resistivity measurement are measured by at least one or more methods.

4. The underground localization method of claim 1, wherein the computing of the location information of the dead reckoning comprises:

measuring a movement length of drill equipment using the distance movement sensor;

measuring 3-axis angular velocity values using the gyro sensor; and computing the location information of the dead reckoning.

5. The underground localization method of claim 1, wherein the searching for of the physical information which is determined as being matched with the location information of the dead reckoning comprises:

measuring the physical information according to location information of the dead reckoning at a first sensor, which is installed in a front portion of the moving equipment, when the moving equipment moves forward;

measuring the physical information according to location information at a second sensor which is installed in a rear portion of the moving equipment;

comparing the results measured by the first and second sensors; and searching for the physical information which is determined as being matched with the location information of the dead reckoning.

6. The underground localization method of claim 1, wherein the searching for of the physical information which is determined as being matched with the location information of the dead reckoning comprises:

measuring the physical information according to location information of the dead reckoning at a first sensor when the moving equipment moves forward;

measuring the physical information according to location information of the dead reckoning at a second sensor when the moving equipment moves backward;

comparing the results measured by the first and second sensors; and searching for the physical information which is determined as being matched with the location information of the dead reckoning.

7. An underground localization system comprising:

a location computing unit configured to compute location information of a dead reckoning using a gyro sensor and a distance movement sensor of moving equipment;

a location re-measurement unit configured to measure physical information according to the location information of the dead reckoning, which is computed by the location computing unit, and to search for the physical information which is determined as being matched with the location information of the dead reckoning; and a location optimizing unit configured to optimize a location by reflecting location information of the physical information which is determined as being matched with the location information of the dead reckoning.

8. The underground localization system of claim 7, wherein the location re-measurement unit comprises:

a physical information mapping unit configured to measure and map the physical information using a sensor according to the location information of the dead reckoning, which is computed by the location computing unit;

a physical information search unit configured to compare and analyze the physical information and the location information of the dead reckoning and to search for the physical information which is determined as being matched with the location information of the dead reckoning; and a search result storing unit configured to store location information of the found physical information which is determined as being matched with the location information of the dead reckoning.

9. The underground localization system of claim 7, wherein the location re-measurement unit comprises:

a first sensor which is installed in a front portion of the moving equipment; and a second sensor which is installed in a rear portion of the moving equipment, wherein the first sensor measures the physical information according to location information of the dead reckoning when the moving equipment moves forward, wherein the second sensor measures the physical information according to location information of the dead reckoning, and wherein the location re-measurement unit compares the results measured by the first and second sensors and searches for the physical information which is determined as being matched with the location information of the dead reckoning.

10. The underground localization system of claim 7, wherein the location re-measurement unit comprises:

first and second sensors configured to measure the physical information, wherein the first sensor measures the physical information according to location information of the dead reckoning when the moving equipment moves forward, wherein the second sensor measures the physical information according to location information of the dead reckoning when the moving equipment moves backward, and wherein the location re-measurement unit compares the results measured by the first and second sensors and searches for the physical information which is determined as being matched with the location information of the dead reckoning.

* * * * *